United States Patent
Yamamura

(10) Patent No.: US 7,502,140 B2
(45) Date of Patent: *Mar. 10, 2009

(54) IMAGE PROCESSING APPARATUS

(75) Inventor: Toshimi Yamamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 882 days.

This patent is subject to a terminal disclaimer.

(21) Appl. No.: 10/856,843

(22) Filed: Jun. 1, 2004

(65) Prior Publication Data

US 2004/0218219 A1    Nov. 4, 2004

Related U.S. Application Data

(62) Division of application No. 09/451,774, filed on Dec. 1, 1999, now Pat. No. 6,775,027.

(30) Foreign Application Priority Data

Dec. 4, 1998    (JP)    ................. 10-345865

(51) Int. Cl.
*H04N 1/405* (2006.01)

(52) U.S. Cl. ................. 358/1.9; 358/3.03; 358/3.04; 382/252

(58) Field of Classification Search ............... 358/3.03, 358/3.04, 3.05, 1.9, 3.01, 3.06, 3.21, 3.23, 358/3.24; 382/251, 252

See application file for complete search history.

(56) References Cited

U.S. PATENT DOCUMENTS 6,011,907 A    1/2000    Shimura et al.

(Continued)

FOREIGN PATENT DOCUMENTS

JP    3-109871    5/1991

(Continued)

OTHER PUBLICATIONS

"Improved Error Diffusiion on Imaging Systems", IBM Technical Disclosure Bulletin, vol. 33, No. 1A, Jun. 1990, pp. 65-69.

(Continued)

*Primary Examiner*—Thomas D Lee
(74) *Attorney, Agent, or Firm*—Oblon, Spivak, McClelland, Maier & Neustadt, P.C.

(57) ABSTRACT

An error adding step adds together input multi-tone image data and peripheral error information. An adding/subtracting step adds to or subtracts from multi-tone image data calculated by the error adding step, a random number in a matrix prepared for each set of pixels of the input multi-tone image data. A quantizing step quantizes multi-tone image data calculated by the adding/subtracting step into image data, the number of bits of which image data being smaller than the number of bits of the multi-tone image data calculated by the adding/subtracting step. An error calculating step calculates an error based on the multi-tone image data calculated by the error adding step and the image data quantized by the quantizing step. An error storing step stores the error calculated by the error calculating step for each peripheral pixel. An error operation step calculates peripheral error information based on the error stored by the error storing step for each peripheral pixel, and provides the peripheral error information to the error adding step.

3 Claims, 18 Drawing Sheets

U.S. PATENT DOCUMENTS 6,307,978 B1 10/2001 Metaxas
6,775,027 B1 * 8/2004 Yamamura ................. 358/1.9

FOREIGN PATENT DOCUMENTS

| JP | 3-136467 | 6/1991 |
|---|---|---|
| JP | 6-301364 | 10/1994 |
| JP | 7-111591 | 4/1995 |
| JP | 8-191389 | 7/1996 |
| JP | 9-098290 | 4/1997 |
| JP | 10-13626 | 1/1998 |
| JP | 10-191051 | 7/1998 |

OTHER PUBLICATIONS

J.C. Stoffel, et al. "A Survey of Electronic Techniques for Pictorial Image Reproduction", IEEE Transactions on Communications, vol. COM-29, No. 12, Dec. 1981, pp. 1898-1925.

James D. Foley, et al. "Computer Graphics Principles and Practice", Addison-Wesley Publishing Company, Second Edition in C, Nov. 1992, pp. 887-888.

* cited by examiner

FIG. 8

| 1/16 | 2/16 | 4/16 | 2/16 | 1/16 |
|------|------|------|------|------|
| 2/16 | 4/16 | $D_{ij}$ | | |

| aa | ab | ac | ad | ae | af | ag | ah |
|----|----|----|----|----|----|----|----|
| ba | bb | bc | bd | be | bf | bg | bh |
| ca | cb | cc | cd | ce | cf | cg | ch |
| da | db | dc | dd | de | df | dg | dh |
| ea | eb | ec | ed | ee | ef | eg | eh |
| fa | fb | fc | fd | fe | ff | fg | fh |
| ga | gb | gc | gd | ge | gf | gg | gh |
| ha | hb | hc | hd | he | hf | hg | hh |

RANDOM-NUMBER ADDING/SUBTRACTING MATRIX EXAMPLE

EXAMPLE OF MATRIX-DATA ADDING/SUBTRACTING PORTION INCLUDING RAM

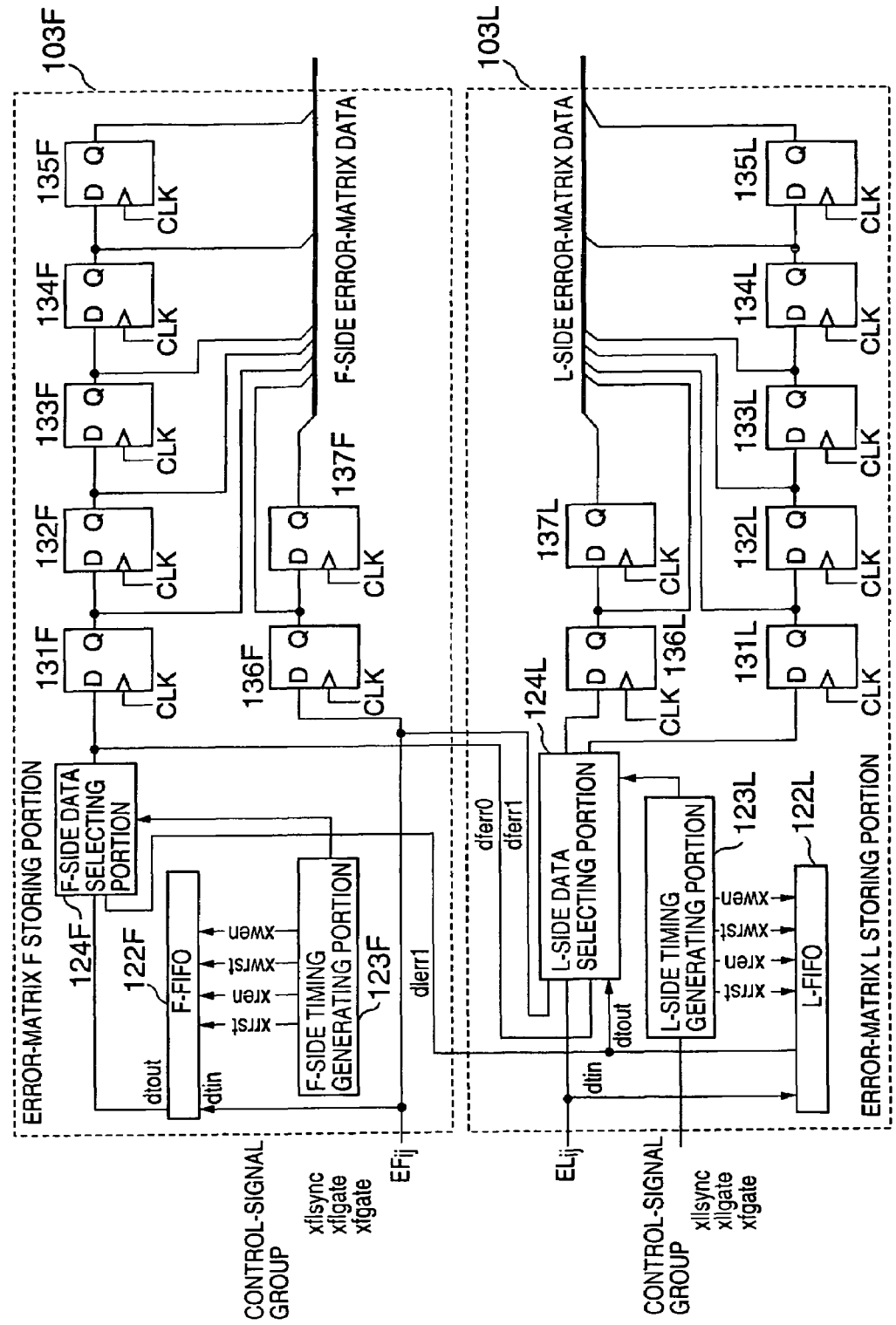

IMAGE PROCESSING APPARATUS

CROSS REFERENCE TO RELATED APPLICATION

This application is a divisional of application Ser. No. 09/451,774, filed Dec. 1, 1999, and is based upon and claims the benefit of priority from the prior Japanese Patent Application No. 10-345865, filed Dec. 4, 1998, the entire contents of both of which are incorporated herein by reference.

BACKGROUND OF THE INVENTION

1. Field of the Invention

The present invention generally relates to an image processing method in which error diffusion is performed on multi-tone image data, and the multi-tone image data is quantized so that the number of bits of the data is reduced.

2. Description of the Related Art

Generally speaking, in such an image processing method, when input image data is controlled, the control is performed based on a sub-scan range signal and a main scan range signal which indicate an image range in a sub-scan direction and an image range in a main scan direction, respectively, and a main scan synchronization signal which indicates a starting point. Description will now be made with reference to a digital copier shown in FIGS. 1 and 2. An original-image sheet is set on an original-image-sheet table 1 in a condition in which a side to be read faces downward. The original-image sheet is illuminated by a light source 2, and, thereby, light is reflected by the original-image sheet. The reflected light is read by a CCD image sensor (hereinafter, simply referred to as a CCD) 5 via a mirror 3, and a lens-and-relay-mirror group 4.

Then, with reference to FIG. 3, a relation between read image data and image control signals will now be described. The sub-scan range signal FGATE indicates a range in which the light source 2 and mirror 3 scan the original-image sheet in the sub-scan direction. The main scan range signal LGATE indicates a range in which the CCD 5 scans the original-image sheet in the main scan direction. Reading in the main scan direction performed by the CCD 5 is performed line by line, that is, line 1, line 2, line 3, . . . , based on the main scan synchronization signal LSYNC, as shown in FIG. 4. FIG. 5 shows timings of these signals xfgate (FGATE), xlgate (LGATE) and xlsync (LSYNC).

In the digital copier, in order to process the read image data, a CPU 10 sends instructions of processing and setting to a scanner 11, an image processing portion 12, an image storing portion 13 and a printer 14, as shown in FIG. 6. The image data read through the CCD 5 is converted from an analog signal into a digital signal through the scanner 11 and correction depending on characteristics of the scanner is performed on the image data. Then, the image processing portion 12 performs image-quality processing such as dither, error diffusion and or the like on the image data. Then, the image data is output to the image storing portion 13 in accordance with an image format of a subordinate block. The image storing portion 13 has at least an image editing memory for one sheet of copy output paper (transfer paper) and a large-capacity storage medium such as a HD (Hard Disk). The printer 14 prints the image on the transfer paper based on the image data from the image storing portion 13.

FIG. 7 shows an error-diffusion processing portion in the image processing portion 12 in the related art. An error adding portion 100 performs error correction by adding together input image data $D_{ij}$ of a to-be-processed pixel (i, j) and peripheral error information E from an error operation portion 104. Image data $S_{ij}$ obtained as a result of the error correction being performed on the image data $D_{ij}$ is quantized based on quantization thresholds $T_{ij}$ (N bits, for input image data=M (bits), where M>N) and thus undergoes tone processing. Thus-obtained quantized data $G_{ij}$ is output to a phase control portion 105 and an error calculating portion 102. The phase control portion 105 performs phase control on the quantized data $G_{ij}$ in accordance with a phase control setting provided by the CPU 11, and outputs thus-obtained data to a following stage.

Based on the image data $S_{ij}$ obtained through the error correction and the quantized data $G_{ij}$, the error calculating portion 102 calculates a quantization error $E_{ij}$ at the time the input image data $D_{ij}$ has been quantized. The quantization error $E_{ij}$ is stored in an error-matrix storing portion 103. Based on this quantization error $E_{ij}$ and the coefficients of a matrix of 5+2 pixels (error diffusion matrix) such as that shown in FIG. 8, the error operation portion 104 calculates input-image-data-$D_{ij}$ peripheral error information E as shown in the following equation (1), and provides the calculated information E to the error adding portion 100:

$$E=(E_{i-2,j-1}+2\times E_{i-1,j-1}+4\times E_{i,j-1}+2\times E_{i+1,j-1}+E_{i+2,j-1}+2\times E_{i-2,j}+4\times E_{i-1,j})/16 \qquad (1)$$

However, when the error-diffusion processing is performed, image degradation due to texture unique to this processing occurs. In order to prevent it, in the related art, for example, as disclosed in Japanese Laid-Open Patent Application No. 9-233348, when a multi-tone image is quantized into a two-tone image using a converting-into-two-tone-image-data threshold in an N×M matrix, blue noise is reduced as a result of adding a random number to the converting-into-two-tone-image-data threshold.

In the above-mentioned related art, because a random number is added to the converting-into-two-tone-image-data threshold, this method can be used in a case where a multi-tone image is quantized into a two-tone image. However, it is not possible to use this method in a case where a multi-tone image is converted into a three-or-more-tone image. If this method is applied to the above-mentioned case, in a three-or-more-tone image, a pseudo-contour frequently appears due to change in texture due to repetition of quantized data obtained as a result of data close to a quantization threshold being quantized and quantized data obtained as a result of data at the middle between adjacent quantization thresholds being quantized.

Further, with a recent improvement in processing ability, an image data format in image processing and a relationship between a synchronization signal of image data and image data are improved, the number of quantization bits is reduced and the image data for a plurality of pixels is packed, and, thereby, the image data for the plurality of pixels are processed at once, and a plurality of lines are processed in parallel as disclosed by Japanese Laid-Open Patent Application No. 10-13626, or each line is divided and image data of respective divisions are processed in parallel, so that the image processing speed has been improved.

SUMMARY OF THE INVENTION

The present invention has been devised in consideration of the above-mentioned problem, and an object of the present invention is to provide an image processing method which can prevent texture in a case where error diffusion is performed on multi-tone image data and thus the multi-tone-image data is quantized into data so that the number of bits of the multi-tone image data is reduced.

Another object of the present invention is to provide an image processing method which can prevent texture and perform high-speed-processing in a case where error diffusion is performed on multi-tone image data obtained as a result of each line being divided and thus-obtained divisions being read separately and in parallel, that is, an original image being read in a manner in which corresponding divisions of the original image are read separately in parallel, and the multi-tone image data is quantized into data so that the number of bits of the multi-tone image data is reduced.

In order to achieve the above-mentioned objects, an image processing method according to the present invention comprises:

an error adding portion of adding together input multi-tone image data and peripheral error information;

an adding/subtracting portion of adding to or subtracts from multi-tone image data calculated by the error adding portion, a random number in a matrix prepared for each set of pixels of the input multi-tone image data;

a quantizing portion which quantizes multi-tone image data calculated by the adding/subtracting portion into image data, the number of bits of which image data being smaller than the number of bits of the multi-tone image data calculated by the adding/subtracting portion;

an error calculating portion which calculates an error based on the multi-tone image data calculated by the adding/subtracting portion and the image data quantized by the quantizing portion;

an error storing portion which stores the error calculated by the error calculating portion for each peripheral pixel; and an error operation portion which calculates peripheral error information based on the errors stored by the error storing portion for respective peripheral pixels, and provides the peripheral error information to the error adding portion.

In this arrangement, a random number in a matrix prepared for each set of pixels of input multi-tone image data is added to or subtracted from multi-tone image data, and thus-calculated multi-tone image data is quantized so that the number of bits of thus-obtained image data is smaller than the number of bits of the above-mentioned calculated multi-tone image data. Therefore, in a case where error diffusion is performed on multi-tone image data and thus the multi-tone image data is quantized so that the number of bits of the image data is reduced, texture can be prevented from occurring.

An image processing method according to another aspect of the present invention comprises:

an error adding portion of adding together input multi-tone image data and peripheral error information;

an adding/subtracting portion of adding to or subtracts from, in accordance with 1-bit data in a matrix prepared for each set of pixels of the input multi-tone image data, multi-tone image data calculated by the error adding portion, a predetermined adding/subtracting value;

a quantizing portion which quantizes multi-tone image data calculated by the adding/subtracting portion into image data, the number of bits of which image data being smaller than the number of bits of the multi-tone image data calculated by the adding/subtracting portion;

an error calculating portion which calculates an error based on the multi-tone image data calculated by the adding/subtracting portion and the image data quantized by the quantizing portion;

an error storing portion which stores the error calculated by the error calculating portion for each peripheral pixel; and an error operation portion which calculates peripheral error information based on the errors stored by the error storing portion for respective peripheral pixels, and provides the peripheral error information to the error adding portion.

In this arrangement, because data in the matrix prepared for each set of pixels of the input multi-tone image data is 1-bit data indicating either addition or subtraction, it is possible to prevent texture from occurring without increasing the capacity of the memory.

An image processing method according to another aspect of the present invention comprises a plurality of error-diffusion processing portions provided for image data of a plurality of divisions of each line, respectively, each of the plurality of error-diffusion processing portions comprising:

an error adding portion of adding together input multi-tone image data of a respective one of the plurality of divisions and peripheral error information;

an adding/subtracting portion of adding to or subtracts from multi-tone image data calculated by the error adding portion, a random number in a matrix prepared for each set of pixels of the input multi-tone image data of the respective one of the plurality of divisions;

a quantizing portion which quantizes multi-tone image data calculated by the adding/subtracting portion into image data, the number of bits of which image data being smaller than the number of bits of the multi-tone image data calculated by the adding/subtracting portion;

an error calculating portion which calculates an error based on the multi-tone image data calculated by the error adding portion and the image data quantized by the quantizing portion;

an error storing portion which stores the error calculated by the error calculating portion for each peripheral pixel; and an error operation portion which calculates the peripheral error information based on the errors stored in the error storing portion for respective peripheral pixels, and provides the peripheral error information to the error adding portion, wherein, in order to enable the error operation portion of each of the plurality of error-diffusion processing portions to calculate the peripheral error information based on the errors of respective peripheral pixels at a boundary between adjacent divisions, the error of at least one peripheral pixel at the boundary is sent/received between at least two error storing portions.

In this arrangement, in a case where each line is divided into a plurality of divisions, and error-diffusion processing is performed on image data of each one of the plurality of divisions, in order to enable each of a plurality of error operation portions to calculate peripheral error information based on errors of respective peripheral pixels at a boundary, error(s) of peripheral pixel(s) at the boundary is(are) sent/received between error storing portions. Thereby, it is possible to prevent texture from occurring and to achieve high-speed processing, in a case where each line is divided into a plurality of divisions, error-diffusion processing is performed on multi-tone image data of each one of the plurality of divisions, and, thus, the multi-tone image data is quantized so that the number of bits of the image data is reduced.

Other objects and further features of the present invention will become more apparent from the following detailed description when read in conjunction with the accompanying drawings.

BRIEF DESCRIPTION OF THE DRAWINGS

FIG. 8 illustrates an error diffusion matrix;

15 FIG. 17B is a circuit diagram showing the error-matrix F storing portion and error-matrix L storing portion shown in FIG. 17A in more detail;

DETAILED DESCRIPTION OF THE PREFERRED EMBODIMENTS

Embodiments of the present invention will now be described making reference to drawings.

Figure 9:
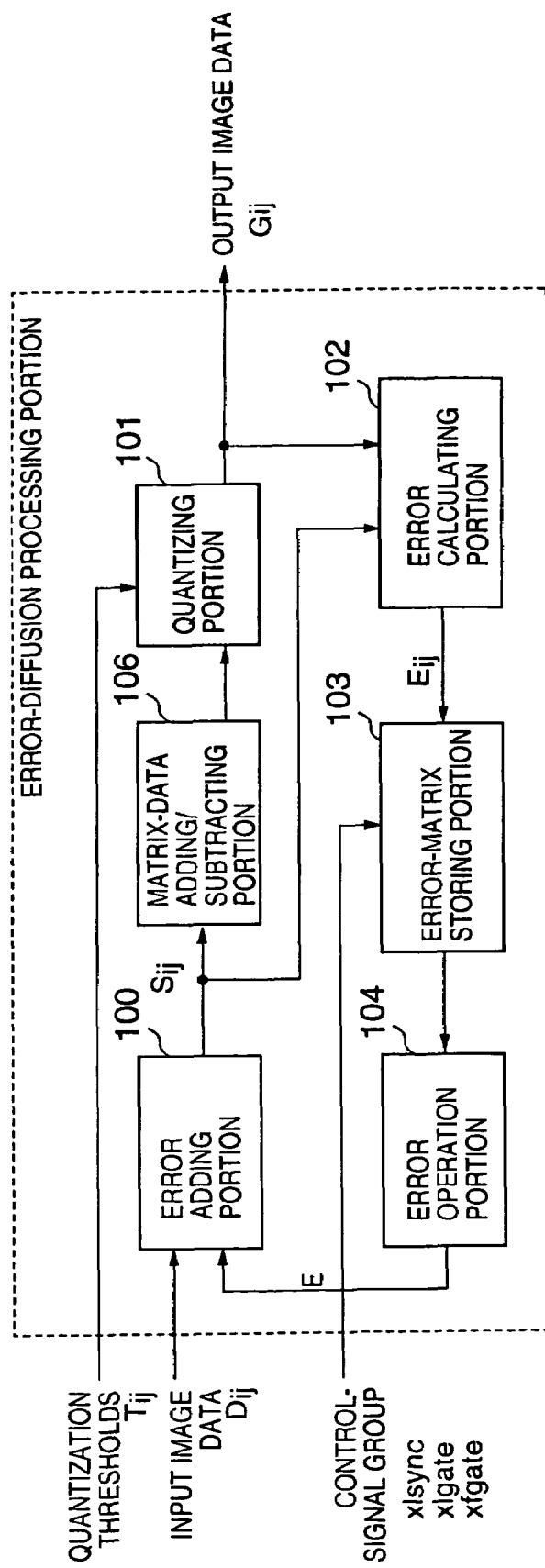
FIG. 9 is a block diagram showing an error-diffusion processing portion of an image processing method in a first embodiment of the present invention.
Figures 10, 11:
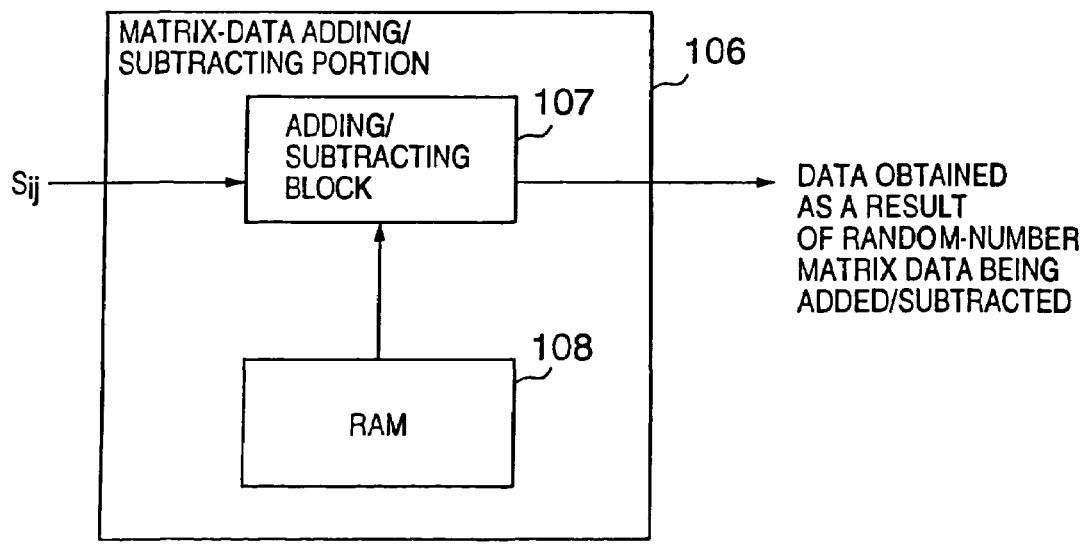
FIG. 10 illustrates a matrix of a matrix-data adding/subtracting portion shown in FIG. 9.
FIG. 11 is a block diagram showing an arrangement of the matrix-data adding/subtracting portion in detail.

FIG. 9 is a block diagram showing an error-diffusion processing portion included in an image processing method in a first embodiment of the present invention. Except for the error-diffusion processing portion, the image processing method in the first embodiment is the same as the image processing method in the related art described above with reference to FIGS. 1, 2, 3, 4 and 5. FIG. 10 is an explanatory diagram showing a matrix of a matrix-data adding/subtracting portion shown in FIG. 9. FIG. 11 is a block diagram showing an arrangement of the matrix-data adding/subtracting portion in detail.

In FIG. 9, an error adding portion 100 performs error correction by adding together input image data $D_{ij}$ of a to-be-processed pixel (i, j) and peripheral error information E from an error operation portion 104. Image data $S_{ij}$ obtained as a result of the error correction being performed on the image data $D_{ij}$ through the error adding portion 100 is output to the matrix-data adding/subtracting portion 106 and an error calculating portion 102. An adding/subtracting block 107 (shown in FIG. 11) of the matrix-data adding/subtracting portion 106 performs, on this image data $S_{ij}$ obtained as a result of the error correction being performed on the image data $D_{ij}$, an operation making reference to an adding/subtracting value specified by a random number in a matrix of 8×8 pixels such as that shown in FIG. 10, for example, stored in a RAM 108 (shown in FIG. 11) of the matrix-data adding/subtracting portion 106. The adding/subtracting block 107 of the matrix-data adding/subtracting portion 106 outputs the thus-obtained operation result to a quantizing portion 101.

Specifically, for example, each of the 64 elements 'aa', 'ab', 'ac', ..., 'hf', 'hg' and 'hh' of the matrix of 8×8 pixels shown in FIG. 10 is a random number having a randomly determined plus or minus sign. In a case where each input image data $D_{ij}$ is 8-bit data and may have the maximum value, 256, the maximum absolute value of each element of the matrix is 15 through 20, for example. Then, when the input image data $D_{00}$ (i=0, j=0) is processed, the value of the element 'aa' of the matrix is added to the image data $S_{00}$ obtained as a result of the error correction being performed on the image data $D_{00}$ through the error adding portion 100, and the thus-obtained data is supplied to the quantizing portion 101. Similarly, when the input image data $D_{10}$ (i=1, j=0) is processed, the value of the element 'ab' of the matrix is added to the image data $S_{10}$ obtained as a result of the error correction being performed on the image data $D_{10}$ through the error adding portion 100, and the thus-obtained data is supplied to the quantizing portion 101. Eventually, when the input image data $D_{70}$ (i=7, j=0) is processed, the value of the element 'ah' of the matrix is added to the image data $S_{70}$ obtained as a result of the error correction being performed on the image data $D_{70}$ through the error adding portion 100, and the thus-obtained data is supplied to the quantizing portion 101. Then, when the input image data $D_{01}$ (i=0, j=1) is processed, the value of the element 'ba' of the matrix is added to the image data $S_{01}$ obtained as a result of the error correction being performed on the image data $D_{01}$ through the error adding portion 100, and the thus-obtained data is supplied to the quantizing portion 101. Eventually, when the input image data $D_{71}$ (i=7, j=1) is processed, the value of the element 'bh' of the matrix is added to the image data $S_{71}$ obtained as a result of the error correction being performed on the image data $D_{71}$ through the error adding portion 100, and the thus-obtained data is supplied to the quantizing portion 101. Eventually, when the input image data $D_{77}$ (i=7, j=7) is processed, the value of the element 'hh' of the matrix is added to the image data $S_{77}$ obtained as a result of the error correction being performed on the image data $D_{77}$ through the error adding portion 100, and the thus-obtained data is supplied to the quantizing portion 101.

Similarly, when the input image data $D_{80}$ (i=8, j=0) is processed, the value of the element 'aa' of the same matrix is added to the image data $S_{80}$ obtained as a result of the error correction being performed on the image data $D_{80}$ through the error adding portion 100, and the thus-obtained data is supplied to the quantizing portion 101. Eventually, when the input image data $D_{15,7}$ (i=15, j=7) is processed, the value of the element 'hh' of the same matrix is added to the image data $S_{15,7}$ obtained as a result of the error correction being performed on the image data $D_{15,7}$ through the error adding portion 100, and the thus-obtained data is supplied to the quantizing portion 101.

Similarly, when the input image data $D_{08}$ (i=0, j=8) is processed, the value of the element 'aa' of the same matrix is added to the image data $S_{80}$ obtained as a result of the error correction being performed on the image data $D_{08}$ through the error adding portion 100, and the thus-obtained data is supplied to the quantizing portion 101. Eventually, when the input image data $D_{7,15}$ (i=7, j=15) is processed, the value of the element 'hh' of the same matrix is added to the image data $S_{7,15}$ obtained as a result of the error correction being performed on the image data $D_{7,15}$ through the error adding portion 100, and the thus-obtained data is supplied to the quantizing portion 101.

Thus, the random-number adding/subtracting matrix, such as that shown in FIG. 10, is allocated to each area consisting of 8×8 pixels of the input image sequentially. Thereby, a predetermined one (random number having a randomly determined plus or minus sign) of the 64 elements of the random-number adding/subtracting matrix, stored in the RAM 108, is referenced to, and, thus, the value thereof is added to each pixel of the image data $S_{ij}$, by the adding/subtracting block 107.

It is preferable that, as the size of the pattern of the error diffusion matrix (such as that shown in FIG. 8) is increased, the size of the random-number adding/subtracting matrix (such as that shown in FIG. 10) be increased.

The quantizing portion 101 quantizes, based on quantization thresholds $T_{ij}$ (N bits, for input image data=M (bits), where M>N) from the CPU 11, and, thus performs tone processing on the operation result of the matrix-data adding/subtracting portion 106. (For example, when M=8 (bits) and N=4 (bits), the input image data is 8-bit data and may indicate one of 256 tone values, and the quantized image data is 4-bit data and may indicate one of 16 tone values. Therefore, the number of the thresholds $T_{ij}$ is 15.) The quantizing portion 101 outputs thus-obtained quantized data $G_{ij}$ to a following stage and to the error calculating portion 102. Based on the operation result of the error adding portion 100 and the quantized data $G_{ij}$, the error calculating portion 102 calculates a quantization error $E_{ij}$ at the time the input image data $D_{ij}$ has been quantized. This quantization error $E_{ij}$ is stored in the error-matrix storing portion 103. Based on these quantization errors $E_{ij}$ and the corresponding coefficients of the error diffusion matrix of 5+2 pixels such as those shown in FIG. 8, the error operation portion 104 calculates input-image-data-$D_{ij}$ peripheral error information E as shown in the above-mentioned equation (1), and provides the calculated information E to the error adding portion 100.

Data of fixed values may be previously set in the RAM 108 of the matrix-data adding/subtracting portion 106. However, instead, it is also possible that appropriate random-number data is written in the RAM 108 when it is used, and the adding and subtracting portion 107 uses this random-number data for performing addition/subtraction on the $S_{ij}$ obtained as a result of the error correction being performed on the image data $D_{ij}$.

Thus, a random number is added to/subtracted from the image data $S_{ij}$ obtained as a result of the error correction being performed on the image data $D_{ij}$ through the error adding portion 100, as blue-noise data. Thereby, when the quantizing portion 101 quantizes operation results of the matrix-data adding/subtracting portion 106 using the fixed thresholds, it is possible to reduce pseudo-contours occurring due to texture change due to repetition of quantized data obtained as a result of data close to a quantization threshold being quantized and quantized data obtained as a result of data at the middle between adjacent quantization thresholds being quantized.

Figure 12:
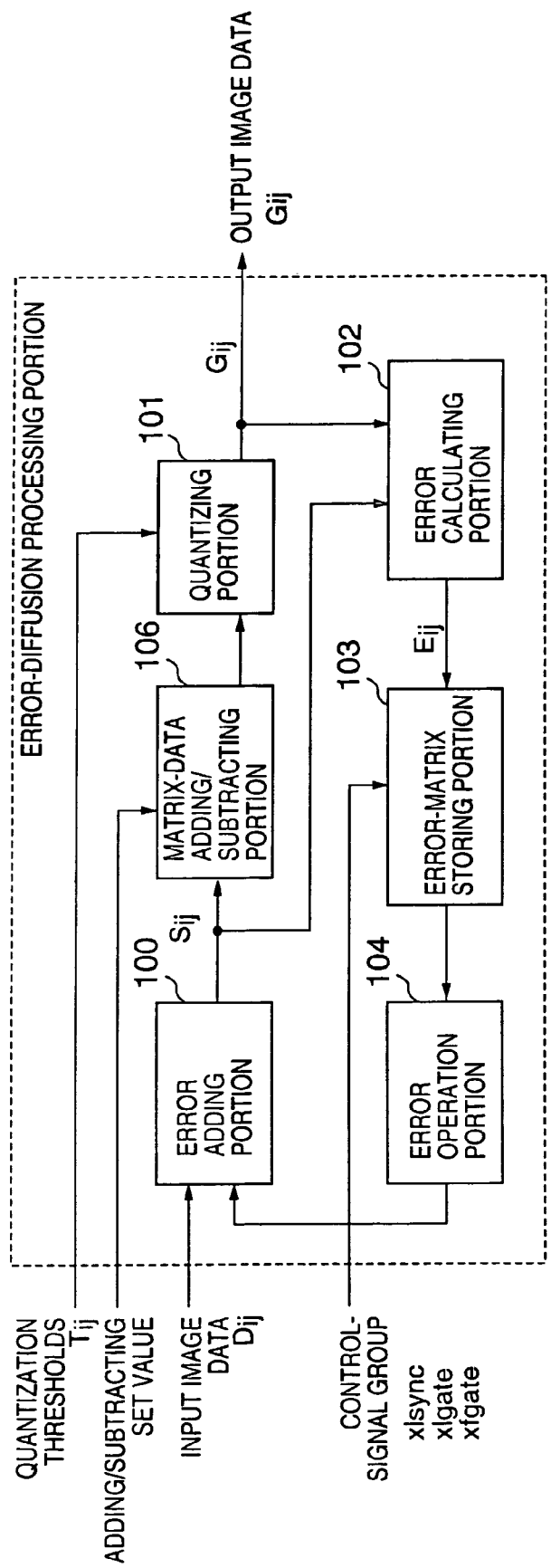
FIG. 12 is a block diagram showing an error-diffusion processing portion of an image processing method in a second embodiment of the present invention.

FIG. 12 is a block diagram showing an error-diffusion processing portion included in an image processing method in a second embodiment of the present invention. Except for the error-diffusion processing portion, the image processing method in the second embodiment is the same as the image processing method in the related art described above with reference to FIGS. 1, 2, 3, 4 and 5. In a RAM 108 of a matrix-data adding/subtracting portion 106, 1-bit data indicating either addition or subtraction is stored. An error adding portion 100 performs error correction by adding input image data $D_{ij}$ of a to-be-processed pixel (i, j) and peripheral error information E from an error operation portion 104 together. The error adding portion 100 outputs image data $S_{ij}$ thus obtained as a result of the error correction being performed on the image data $D_{ij}$ to the matrix-data adding/subtracting portion 106 and an error calculating portion 102. The matrix-data adding/subtracting portion 106 adds to or subtracts from, in accordance with the 1-bit data of the RAM 108, the image data $S_{ij}$ obtained as a result of the error correction being performed on the image data $D_{ij}$, an adding/subtracting set value provided from the CPU 11. The matrix-data adding/subtracting portion 106 outputs the thus-obtained operation result to a quantizing portion 101. The quantizing portion 101 quantizes the operation result of the matrix-data adding/subtracting portion 106 based on quantization thresholds $T_{ij}$ provided from the CPU 11. The quantizing portion 101 outputs thus-obtained quantized data $G_{ij}$ to a following stage and the error calculating portion 102. Based on the image data $S_{ij}$, obtained as a result of the error correction being performed on the image data $D_{ij}$ by the error adding portion 100, and the quantized data $G_{ij}$, the error calculating portion 102 calculates a quantization error $E_{ij}$ at the time the input image data $D_{ij}$ has been quantized. The thus-obtained quantization error $E_{ij}$ is stored in an error-matrix storing portion 103. Based on these quantization errors $E_{ij}$ and the corresponding coefficients of the error diffusion matrix of 5+2 pixels such as that shown in FIG. 8, the error operation portion 104 calculates input-image-data-$D_{ij}$ peripheral error information E and provides the calculated information E to the error adding portion 100.

Specifically, the 1-bit data stored in the RAM 108 of the matrix-data adding/subtracting portion 106 is matrix data such as that shown in FIG. 10. However, in the second embodiment, each of the 64 elements of the matrix is a randomly determined '1' or '0', for example. '1' indicates 'addition' and '0' indicates 'subtraction', for example. The adding/subtracting set value supplied from the CPU 11 to the matrix-data adding/subtracting portion 106 is a fixed value from the values 15 through 20, for example, in a case where the input image data $D_{ij}$ is 8-bit data and may have the maximum value of 256. Then, when the input image data $D_{34}$ (i=3, j=4) is processed, the element 'ed' of the above-mentioned matrix is applied to the corresponding image data $S_{34}$. Assuming that the value of the element 'ed' of the matrix is '1', the adding/subtracting set value, for example, 15, is 'added' to the image data $S_{34}$ obtained as a result of error correction being performed on the image data $D_{34}$ through an error adding portion 100, and the thus-obtained data is supplied to a quantizing portion 101. When the input image data $D_{26}$ (i=2, j=6) is processed, the element 'gc' of the above-mentioned matrix is applied to the corresponding image data $S_{26}$. Assuming that the element 'gc' of the matrix is '0', the adding/subtracting set value, 15, is 'subtracted' from the image data $S_{26}$ obtained as a result of error correction being performed on the image data $D_{26}$ through the error adding portion 100, and the thus-obtained data is supplied to the quantizing portion 101. A manner of applying a predetermined element of the above-mentioned matrix, each of the elements of which matrix is a randomly determined '1' or '0', to each image data $S_{ij}$ is the same as that in the case of the first embodiment in which a predetermined element of the random-number adding/subtracting matrix is applied to each image data $S_{ij}$.

In this arrangement, because only 1-bit data indicating either addition or subtraction is stored in the RAM 108, it is possible to widen the matrix size to the amount of the depth of the data bus of each address by performing parallel-to-serial conversion on the data of the data bus and thus receiving a 1-bit code at a time, or to reduce the capacity of the RAM 108.

Figure 13:
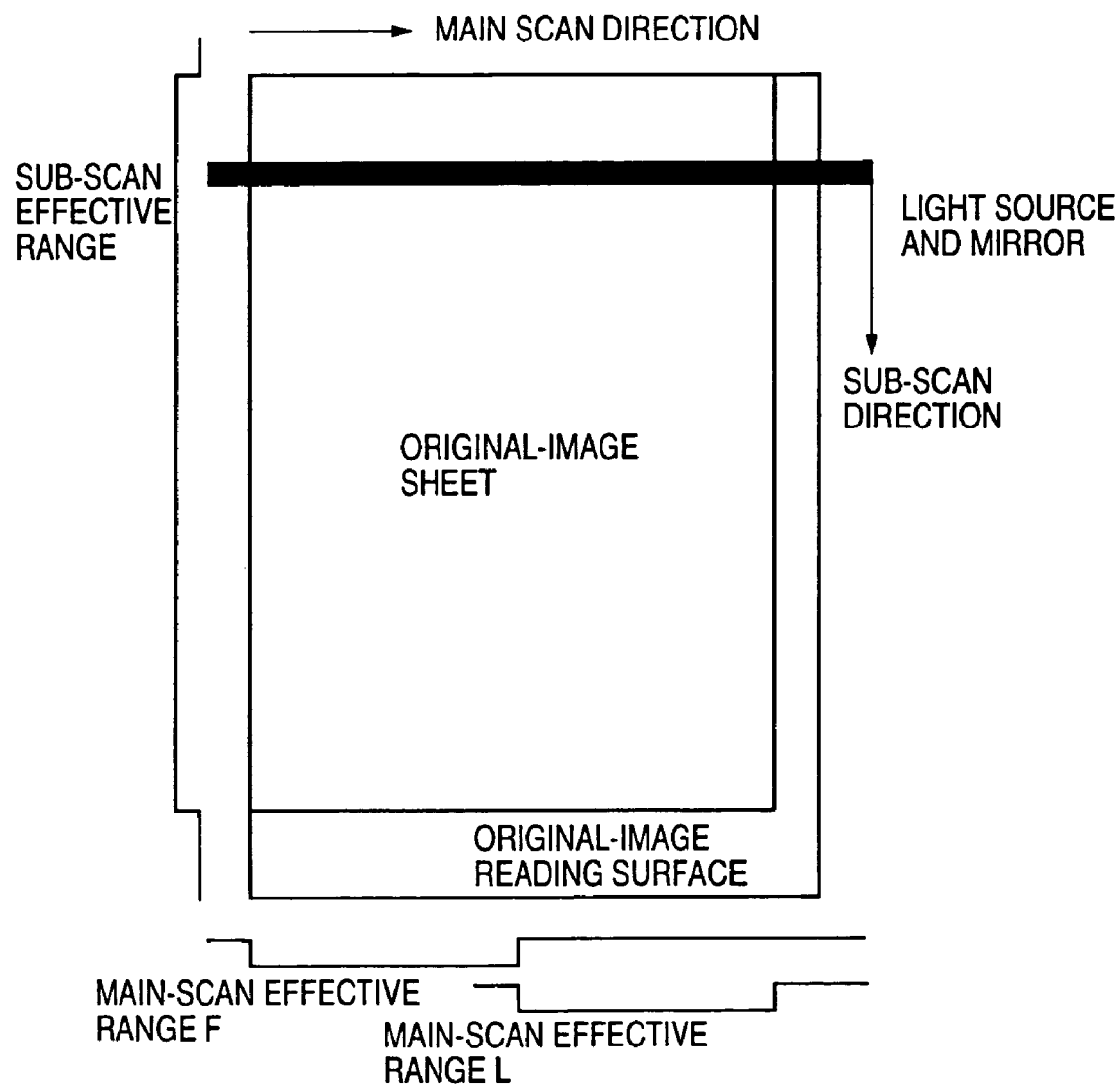
FIGS. 13 and 14 illustrate a case where each line in the main scan direction is divided into two divisions, the two-divisions are scanned and read separately in parallel, and, thus, an original image is scanned and read in a manner in which the first half (left half in the figures) and the latter half (right half) of the original image are scanned and read separately in parallel.
Figure 14:
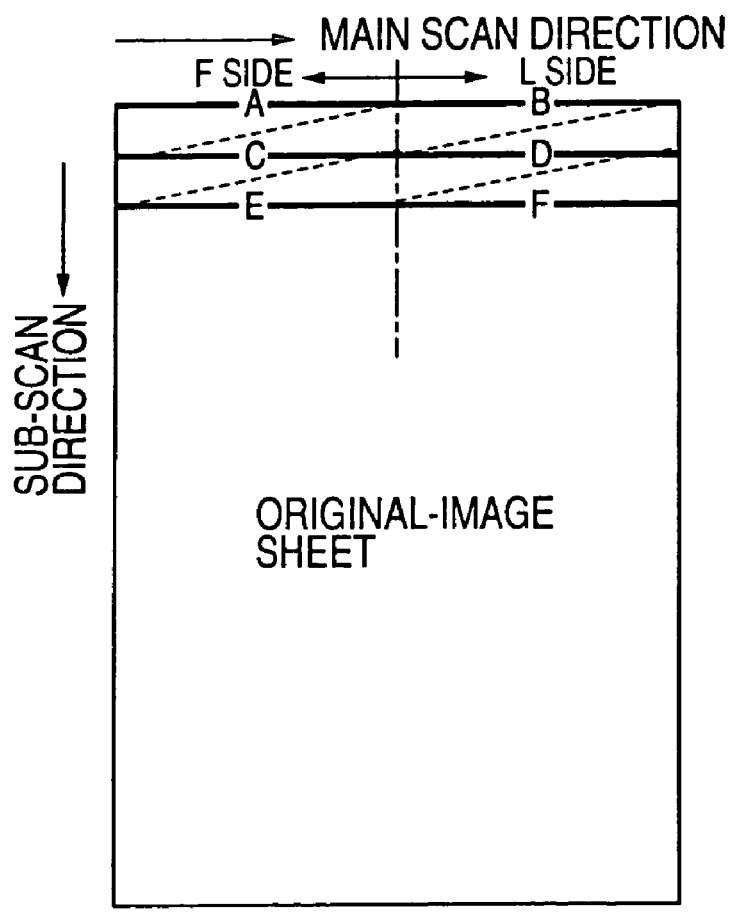

Making reference to FIGS. 13-18, a third embodiment of the present invention will now be described. In the reading optical system shown in FIG. 2, it is possible to arrange a plurality of CCDs 5 in the sub-scan direction in order to increase the reading speed. Thereby, it is possible to read a plurality of lines at once. Further, it is possible to divide one line into a plurality of divisions and arrange a plurality of CCDs 5 in the main scan direction. Thereby, it is possible to read one line at a speed which is 'the number of CCDs 5' times the original speed. FIG. 13 shows an example in which each line is divided into a first half (F) and a latter half (L), the first half and latter half being read separately in parallel, and, thus, an original image being read in a manner in which the corresponding first half and latter half of the original image are read separately in parallel. In this case, as shown in FIG. 14, the F-side (first side) A of the first line, the F-side C of the second line, the F-side E of the third line, . . . are read sequentially by an F-side CCD, and, also, the L-side (latter side) B of the first line, the L-side D of the second line, the L-side F of the third line, . . . are read sequentially by an L-side CCD.

Figure 15:
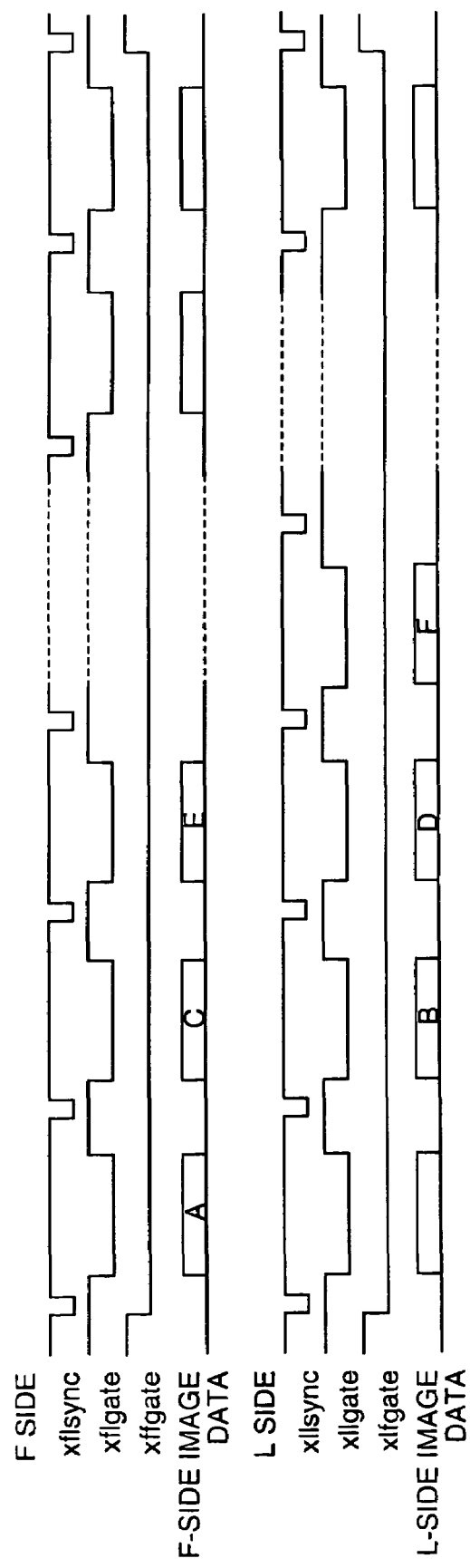
FIG. 15 is a timing chart showing image data and synchronization signals in the case where each line in the main scan direction is divided into two divisions, the two divisions are scanned and read separately in parallel, and, thus an original image is scanned and read in a manner in which the first half and the latter half of the original image are scanned and read separately in parallel.

FIG. 15 shows image data A, B, C, D, E and F and timings of the following synchronization signals in this case:
xflsync: F-side main scan synchronization signal;
xflgate: F-side main scan range signal;
xffgate: F-side sub-scan range signal;
xllsync: L-side main scan synchronization signal;
xllgate: L-side main scan range signal; and
xlfgate: L-side sub-scan range signal.

In FIG. 15, the timings of the synchronization signals of the image data of the F side and the L side are the same as one another. This is because the charge-storage timing of the F-side CCD and the charge-storage timing of the L-side CCD are the same as one another. By differentiate these timings from one another, it is possible to make the timings of the synchronization signals of the image data of the F side and the L side different from one another. Alternatively, by providing a line memory between the scanner 11 and the image processing portion 12, it is possible to make the timings of the synchronization signals of the image data of the F side and the L side different from one another.

Figure 16:
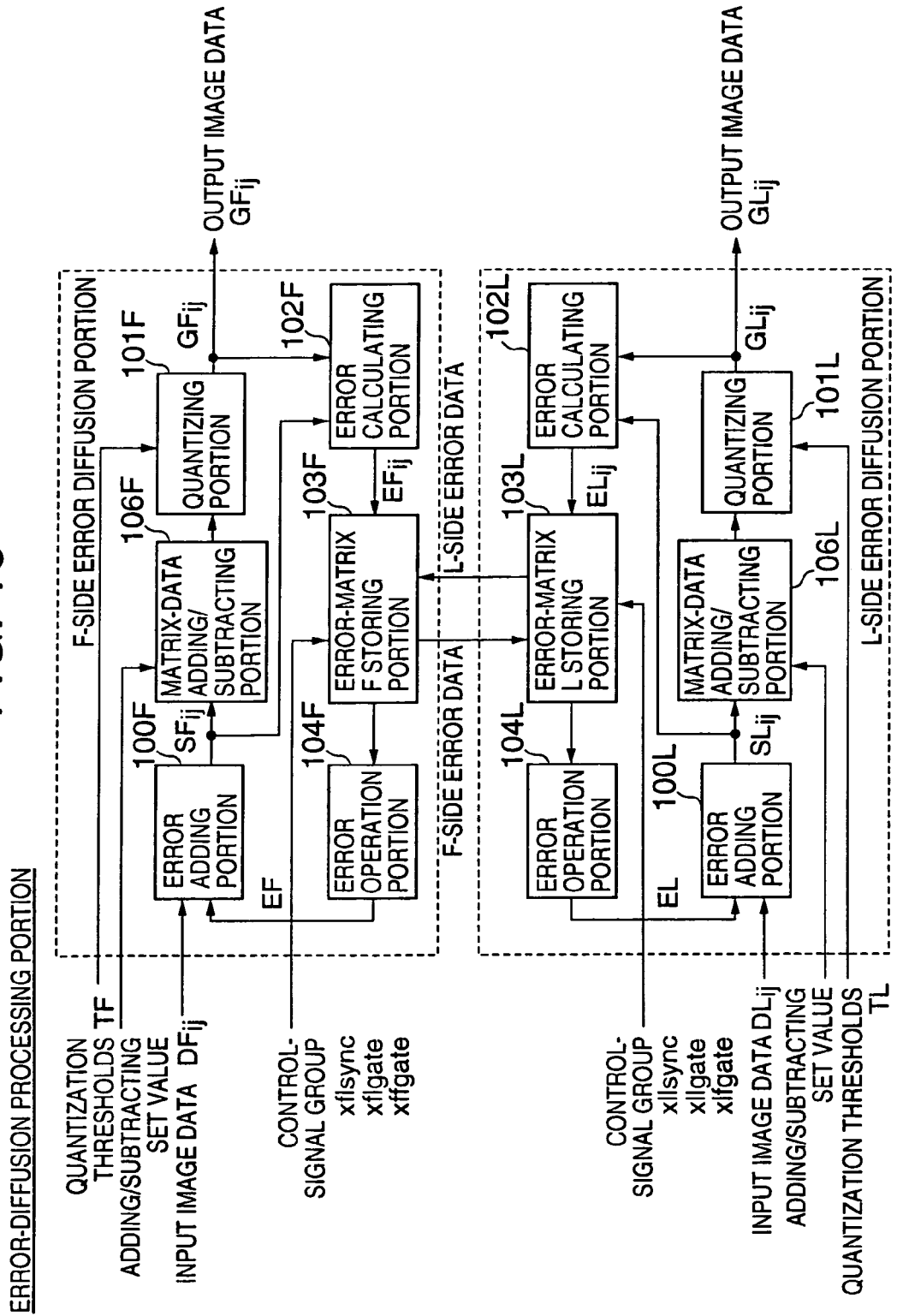
FIG. 16 is a block diagram showing an error-diffusion processing portion of an image processing method in a third embodiment of the present invention.
Figure 17A:
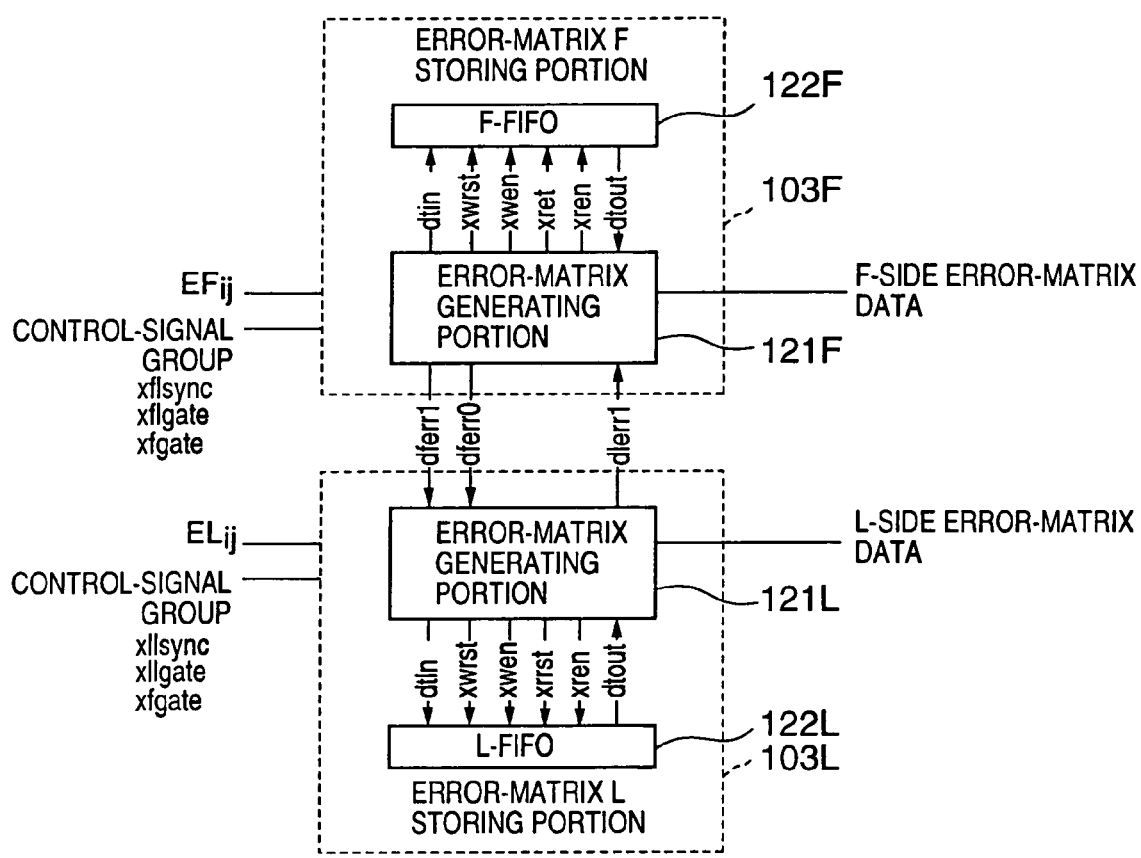
FIG. 17A is a block diagram showing an error-matrix F storing portion and an error-matrix L storing portion of the error-diffusion processing portions shown in FIG. 16 in detail.

FIG. 16 is a block diagram showing an error-diffusion processing portion included in an image processing method in the third embodiment of the present invention. Except for the error-diffusion processing portion, the image processing method in the third embodiment is the same as the image processing method in the related art described above with reference to FIGS. 1, 2, 3, 4 and 5. In the third embodiment, as shown in FIGS. 13, 14 and 15, each line is divided into the first half (F) and the latter half (L), the first half and latter half are scanned and read separately, and, thus, an original image is scanned and read in a manner in which the corresponding first half (left half in the figures) and latter half (right half) of the original image are scanned and read separately in parallel. FIG. 17A shows an error-matrix F storing portion and an error-matrix L storing portion shown in FIG. 16, in detail. The error-diffusion processing portion in the third embodiment includes an F-side error diffusion portion and an L-side error diffusion portion. Each of the F-side and L-side error diffusion portions has the same arrangement as that shown in FIG. 12. An F-side error adding portion 100F performs error correction by adding together F-side input image data $DF_{ij}$ and peripheral error information EF from an F-side error operation portion 104F. An L-side error adding portion 100L performs error correction by adding together L-side input image data $DL_{ij}$ and peripheral error information EL from an L-side error operation portion 104L. The F-side error adding portion 100F outputs image data $SF_{ij}$ thus obtained as a result of the error correction being performed on the image data $DF_{ij}$ to an F-side matrix-data adding/subtracting portion 106F and an F-side error calculating portion 102F. The L-side error adding portion 100L outputs image data $SL_{ij}$ thus obtained as a result of the error correction being performed on the image data $DL_{ij}$ to an L-side matrix-data adding/subtracting portion 106L and an L-side error calculating portion 102L.

The F-side matrix-data adding/subtracting portion 106F adds to or subtracts from, in accordance with 1-bit data of an F-side RAM 108F of the F-side matrix-data adding/subtracting portion 106F, the image data $SF_{ij}$ obtained as a result of the error correction being performed on the image data $DF_{ij}$, an adding/subtracting set value provided from the CPU 11. The F-side matrix-data adding/subtracting portion 106F outputs the thus-obtained operation result to an F-side quantizing portion 101F. The L-side matrix-data adding/subtracting portion 106L adds to or subtracts from, in accordance with 1-bit data of an L-side RAM 108L of the L-side matrix-data adding/subtracting portion 106L, the image data $SL_{ij}$ obtained as a result of the error correction being performed on the image data $DL_{ij}$, an adding/subtracting set value provided from the CPU 11. The L-side matrix-data adding/subtracting portion 106L outputs the thus-obtained operation result to an L-side quantizing portion 101L. The F-side quantizing portion 101F quantizes the operation result of the F-side matrix-data adding/subtracting portion 106F based on quantization thresholds TF provided from the CPU 11. The F-side quantizing portion 101F outputs thus-obtained quantized data $GF_{ij}$ to a following stage and the F-side error calculating portion 102F. The L-side quantizing portion 101L quantizes the operation result of the L-side matrix-data adding/subtracting portion 106L based on quantization thresholds TL provided from the CPU 11. The L-side quantizing portion 101L outputs thus-obtained quantized data $GL_{ij}$ to a following stage and the L-side error calculating portion 102L.

Based on the image data $SF_{ij}$, obtained as a result of the error correction being performed on the image data $DF_{ij}$ by the error adding portion 100F, and the quantized data $GF_{ij}$, the F-side error calculating portion 102F calculates a quantization error $EF_{ij}$ at the time the input image data $DF_{ij}$ has been quantized. Based on the image data $SL_{ij}$, obtained as a result of the error correction being performed on the image data $DL_{ij}$ by the L-side error adding portion 100L, and the quantized data $GL_{ij}$, the L-side error calculating portion 102L calculates a quantization error $EL_{ij}$ at the time the input image data $DL_{ij}$ has been quantized. The thus-obtained quantization error $EF_{ij}$ and quantization error $EL_{ij}$ are stored in an error-matrix F storing portion 103F and an error-matrix L storing portion 103L, respectively, shown in FIG. 17A in detail. Based on the quantization errors $EF_{ij}$ and the coefficients of the error-diffusion matrix of 5+2 pixels such as that shown in FIG. 8, the error operation portion 104F calculates input-image-data-$DF_{ij}$ peripheral error information EF and provides the calculated information EF to the error adding portion 100F. Based on the quantization errors $EL_{ij}$ and the coefficients of the error diffusion matrix of 5+2 pixels such as that shown in FIG. 8, the error operation portion 104L calculates input-image-data-$DL_{ij}$ peripheral error information EL and provides the calculated information EL to the error adding portion 100L.

As shown in FIG. 17A, the error-matrix F storing portion 103F and error-matrix L storing portion 103L have error-matrix generating portions 121F and 121L, and FIFO memories 122F (F-FIFO) and 122L (L-FIFO) for storing the quantization errors $EF_{ij}$, $EL_{ij}$ therein, respectively. Each of the error operation portions 104F, 104L calculates the peripheral error information EF or EL, based on the coefficients of the error diffusion matrix of 5+2 pixels such as that shown in FIG. 8, and based on the error data of the two pixels on the n-th line and the error data of the five pixels on the (n-1)-th line. Therefore, at the boundary between the F side and the L side, as shown in FIG. 18, it is necessary to send/receive the quantization errors $EF_{ij}$, $EL_{ij}$ of the adjacent halves necessary for the calculation of the peripheral error information between the F side and L side.

FIG. 17B shows the error-matrix F storing portion and error-matrix L storing portion in more detail. With regard to the F side, the input error data $EF_{ij}$ is stored in the FIFO memory 122F as write data, and, also, is sent to two FF (Flip-Flops) 136F and 137F as the error data for the currently processed pixel data. An F-side timing generating portion 123F receives a control-signal group, produces read reset xrrst, read enable xren, write reset xwrst and write enable xwen signals for the FIFO memory 122F, causes the error data dtin of the current line to be written in and the error data dout of the preceding line to be output from the FIFO memory 122F. Further, as error-data sending/receiving at the boundary between the F side and L side, the F-side timing generating portion 123F sends a timing control signal for using the error data dlerr1 provided from the L side to an F-side data selecting portion 124F. The F-side data selecting portion 124F receives the error data dtout of the preceding line, the error data dlerr1 from the L side and the timing control signal for using the error data dlerr1 from the L side from the F-side timing generating portion 123F, and outputs the error data of the preceding line to five FFs (Flip-Flops) 131F through 135F. An arrangement of seven FFs 131F through 137F is made for an example of the error diffusion matrix shown in FIG. 8. In this case, the information of the five pixels of the preceding line, that is, the pixel just above the object pixel, and preceding and subsequent pixels is needed as the error data of the preceding line, and the information of the two preceding pixels of the current line is needed as the error data of the current line. Therefore, the seven FFs are needed. The error data is sent to an error operation portion 104F from the FFs in predetermined timing.

With regard to the L side, the input error data $EL_{ij}$ is stored in the FIFO memory 122L as write data, and, also, is sent to an L-side data selecting portion 124L as the error data for the currently processed pixel data. An L-side timing generating portion 123L receives a control-signal group, produces read reset xrrst, read enable xren, write reset xwrst and write enable xwen signals for the FIFO memory 122L, causes the error data dtin of the current line to be written in and the error data dout of the preceding line to be output from the FIFO memory 122L. Further, as error-data sending/receiving at the boundary between the F side and L side, the L-side timing generating portion 123L sends a timing control signal for using the error data dferr1 of the current line from the F side and the error data dferr0 of the preceding line from the F side to the L-side data selecting portion 124L. The L-side data selecting portion 124L receives the L-side error data $EL_{ij}$, the error data dferr1 of the current line from the F side, the error data dferr0 of the preceding line from the F side and the timing control signal for using the error data dferr1 of the current line from the F side and the error data dferr0 of the preceding line from the F side from the F-side timing generating portion 123F, selects one of $EL_{ij}$ and dferr1 and outputs the thus-selected one to two FFs 136L and 137L as the error data of the current line, and selects one of dtout and dferr0 and outputs the thus-selected one to five FFs 131L through 135L as the error data of the preceding line. Similar to the case of the F side, the arrangement of seven FFs 131L through 137L is made for the example of the error diffusion matrix shown in FIG. 8. In this case, the information of the five pixels of the preceding line, that is, the pixel just above the object pixel, and preceding and subsequent pixels are needed as the error data of the preceding line, and the two preceding pixels on the current line are needed as the error data of the current line. Therefore, the seven FFs are needed. The error data is sent to an error operation portion 104L from the FFs in predetermined timing.

Figure 18:
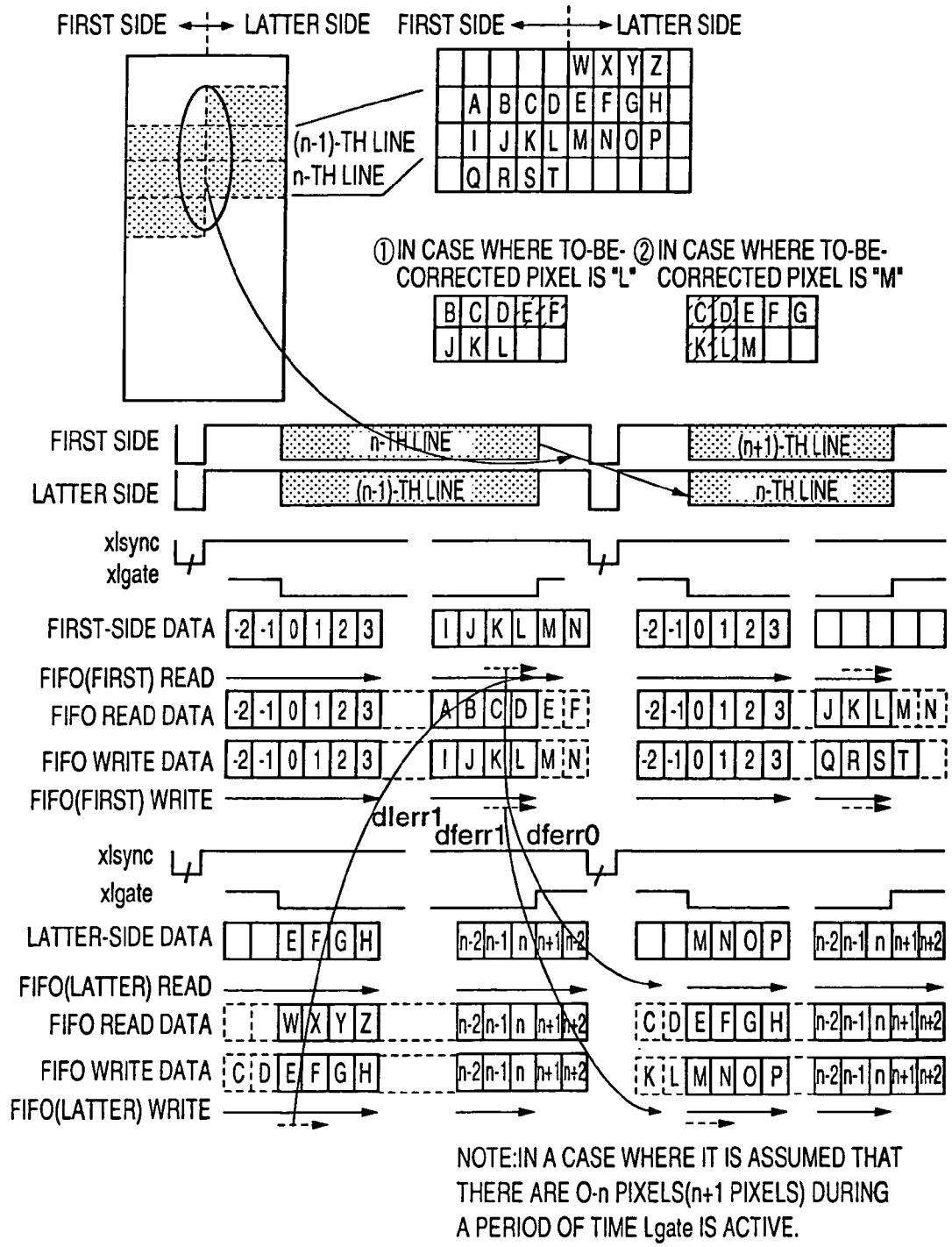
FIG. 18 illustrates processing in which error data is sent/received between the error-matrix F storing portion and error-matrix L storing portion shown in FIG. 17A.

FIG. 18 shows processing timing at a separation point of division of one line into two divisions, in the error-matrix F storing portion 103F and error-matrix L storing portion 103L. Formation of the error diffusion matrix for the last pixel on the F side and the error diffusion matrix for the top pixel on the L side at the boundary between the F side and L side on the sub-scan-direction-n-th line when the line is divided into two divisions (F/L division) as shown in FIG. 18 will now be described.

Figure 8:
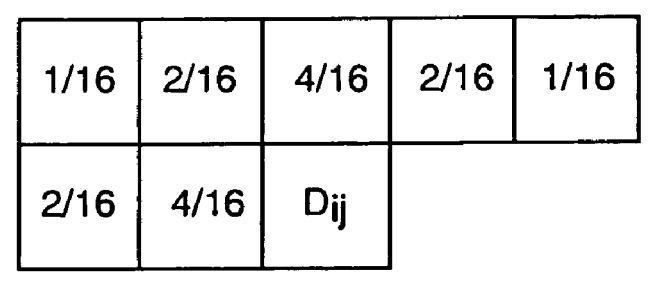

In this case, when error diffusion is performed using the error diffusion matrix of 5+2 pixels, shown in FIG. 8, arranged in the main scan direction and sub-scan direction, the error data of the pixel just above the object pixel, and preceding two pixels and subsequent two pixels of the preceding line, and the error data of the two preceding pixels of the current line are used at the time of the error diffusion. In this case, as shown in FIG. 18, the necessary error data is sent/received between the F side and L side.

In this case, the last pixel 'L' on the F side at the boundary on the n-th line and the first pixel 'M' on the L side at the boundary on the n-th line will now be considered.

① At the time of processing of the last pixel 'L' on the F side on the n-th line, it is necessary to use the quantization errors $EL_{ij}$ (dlerr1) of the first pixel 'E' and the subsequent pixel 'F' on the L side on the (n-1)-th line preceding the n-th line.

② At the time of processing of the first pixel 'M' on the L side on the n-th line, it is necessary to use the quantization errors $EF_{ij}$ (dferr0) of the last pixel 'D' and the preceding pixel 'C' on the L side on the (n−1)-th line preceding the n-th line, and the quantization errors $EF_{ij}$ (dferr1) of the last pixel 'L' and the preceding pixel 'K' on the F side on the n-th line. Thus, the two data sending/receiving operations are needed.

In this case, as shown in FIG. 18 (the processing timing at the separation point of the F/L division), the beginning of the processing of the L-side top pixel can be performed after the processing of the F-side last pixel is finished. This is because the error diffusion for the L-side top pixel needs the error data (dferr1) of the F-side last pixels, which error data is obtained as a result of the F-side last pixels being processed. Accordingly, the processing of the L-side top pixel should be performed after the processing of the F-side last pixel. Further, the error diffusion for the F-side last pixel needs the error data (dlerr1) of the L-side top pixels of the preceding line, which error data is obtained as a result of the L-side top pixels of the preceding line being processed. Therefore, the beginning of the L-side line should be performed before the last processing of the F-side following line. (That is, assuming that the L-side line to be currently processed is the L-side (n−1)-th line, the timing of the beginning of the processing of the L-side (n-1)-th line should be prior to the finish of the processing of the F-side n-th line.)

By this processing, because each line is divided into two halves and the two halves are processed in parallel, it is possible to achieve high-speed processing. Further, because the necessary capacity of the FIFO memories 122F and 122L is the capacity for one line (=(capacity for one line)×(number of parallel processing operations)/(number of divisions)), it is possible to reduce the memory capacity in comparison to the capacity in the case where a plurality of lines are processed in parallel (=(number of parallel processing operations)×(capacity for one line)).

Figure 1:
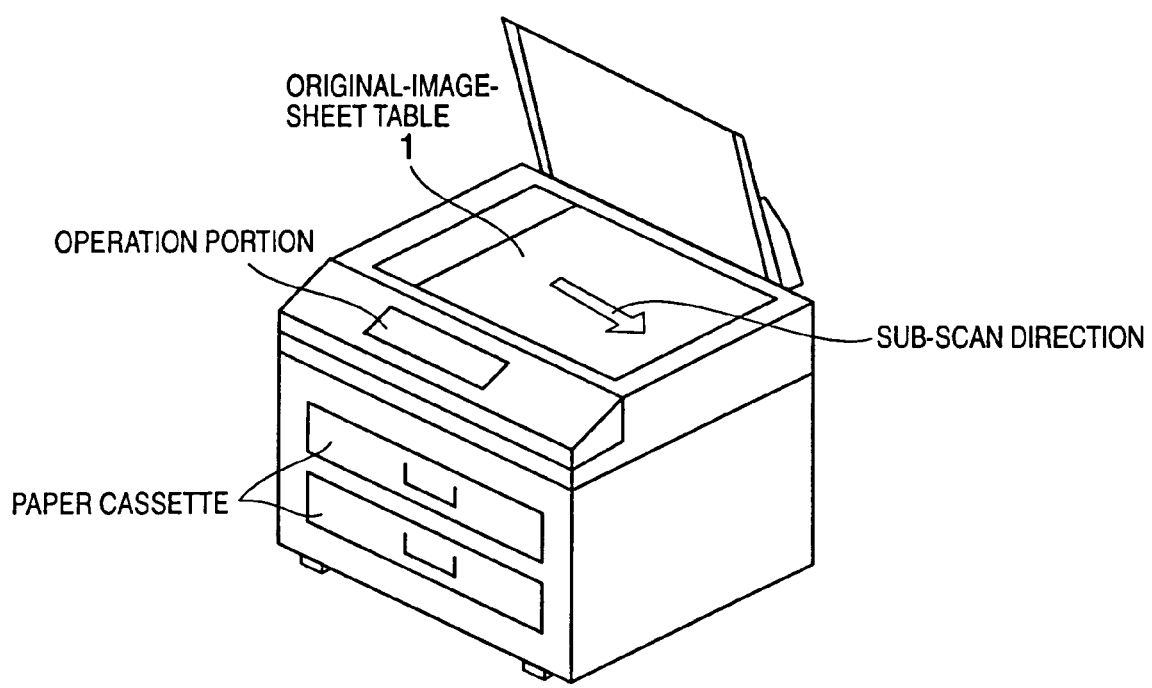
FIG. 1 shows an outward appearance of a digital copier.
Figure 2:
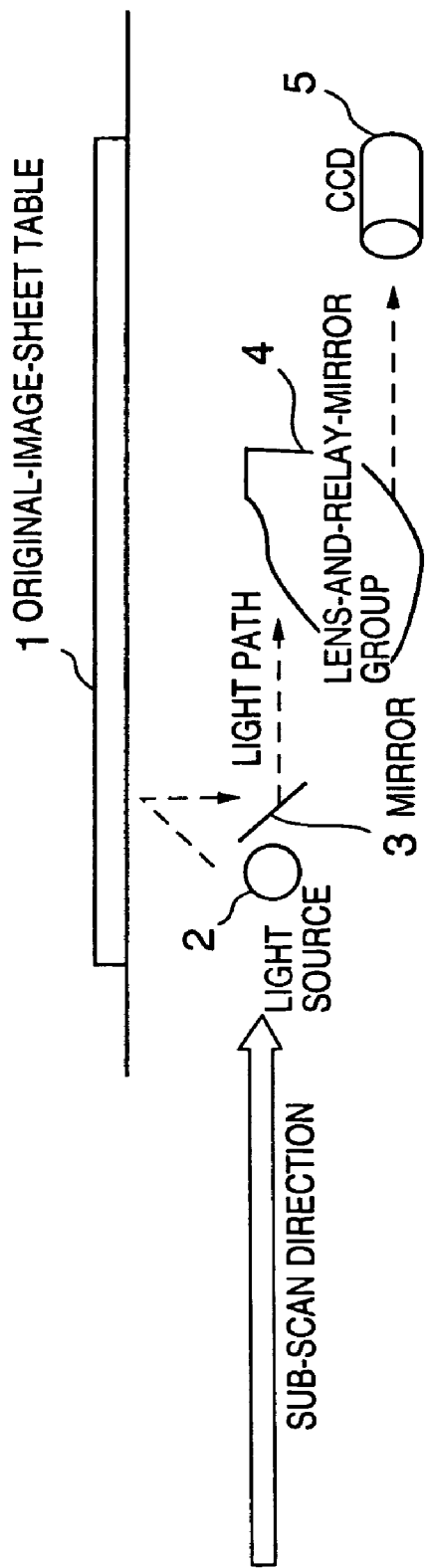
FIG. 2 shows an arrangement of a reading optical system of the digital copier shown in FIG. 1.
Figure 3:
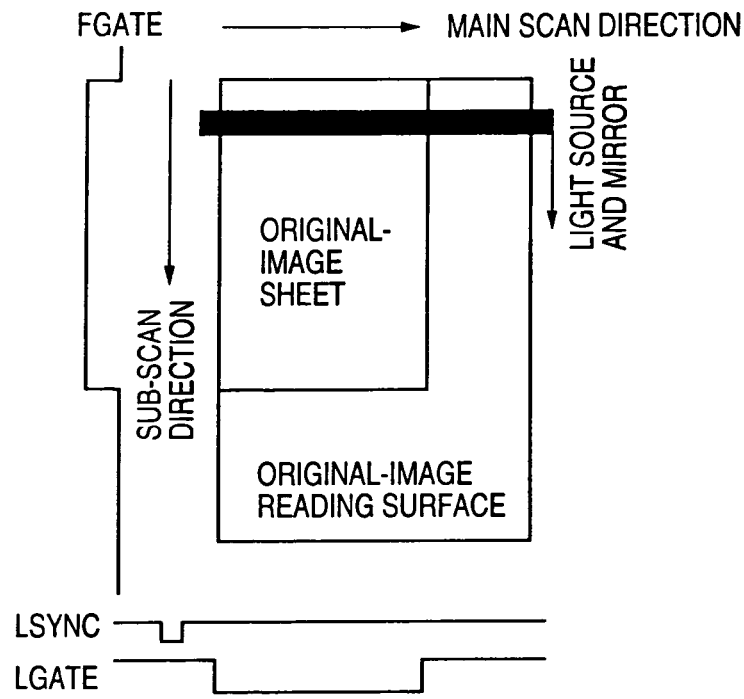
FIG. 3 illustrates a relationship between an original-image sheet and synchronization signals in the digital copier shown in FIG. 1.
Figure 4:
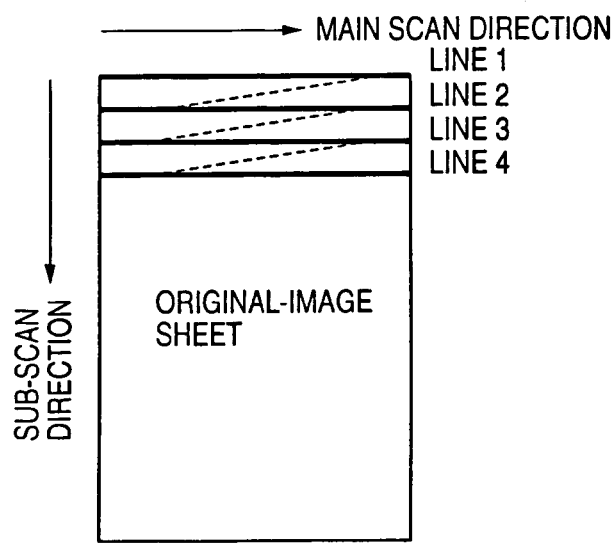
FIG. 4 illustrates main scan lines in the digital copier shown in FIG. 1.
Figure 5:
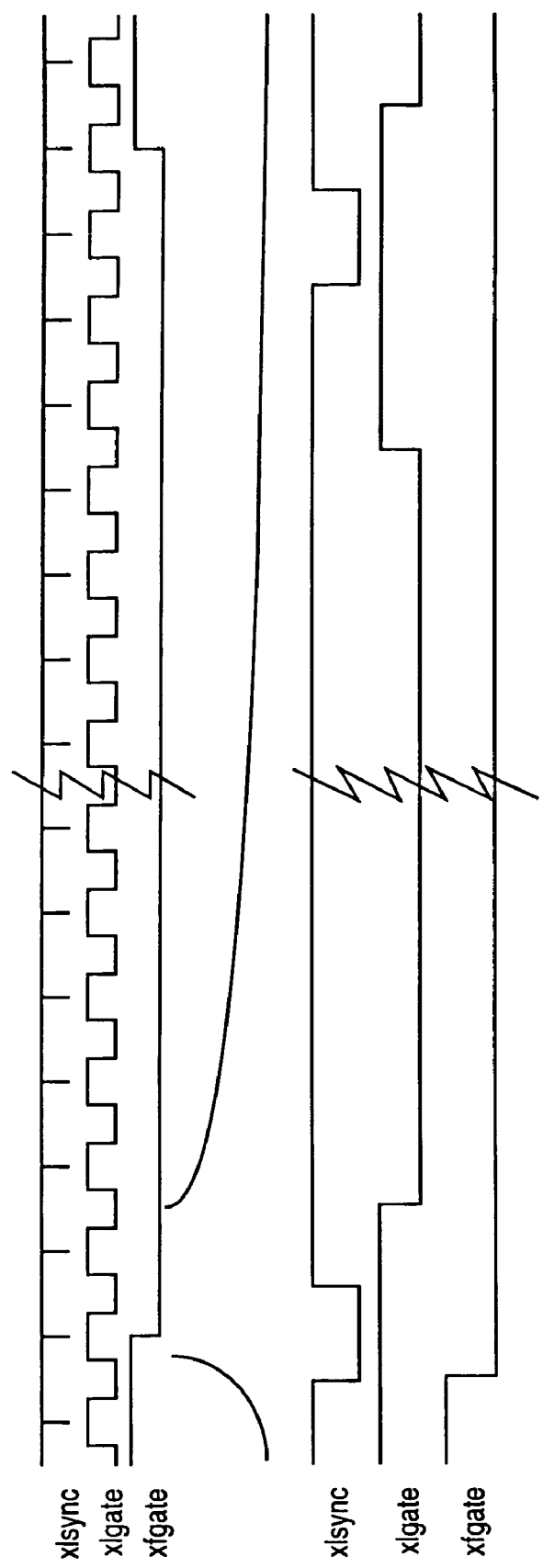
FIG. 5 is a timing chart showing synchronization signals in the case shown in FIGS. 3 and 4.
Figure 6:
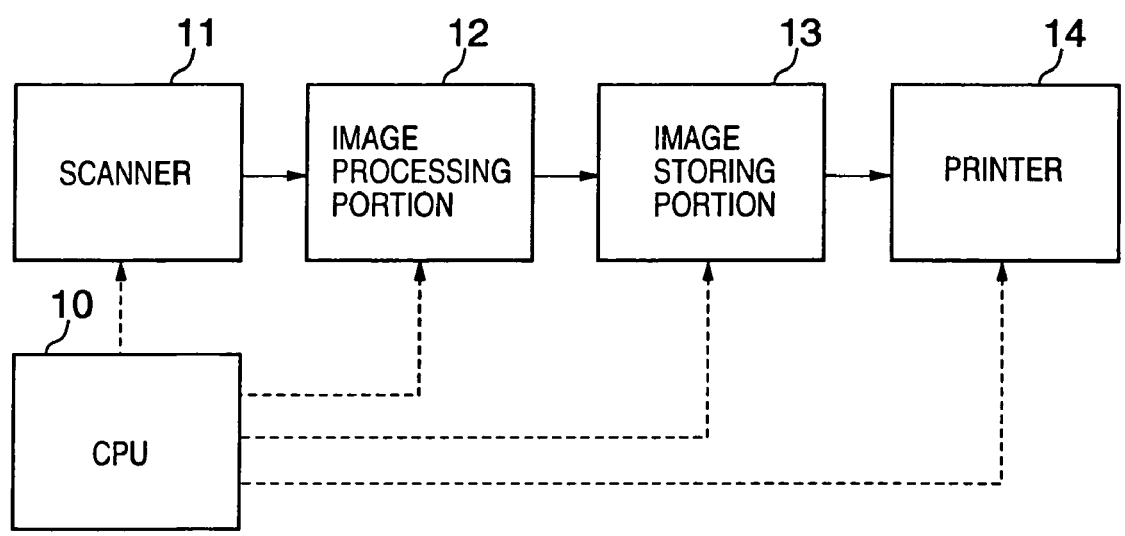
FIG. 6 is a block diagram showing the digital copier shown in FIG. 1.
Figure 7:
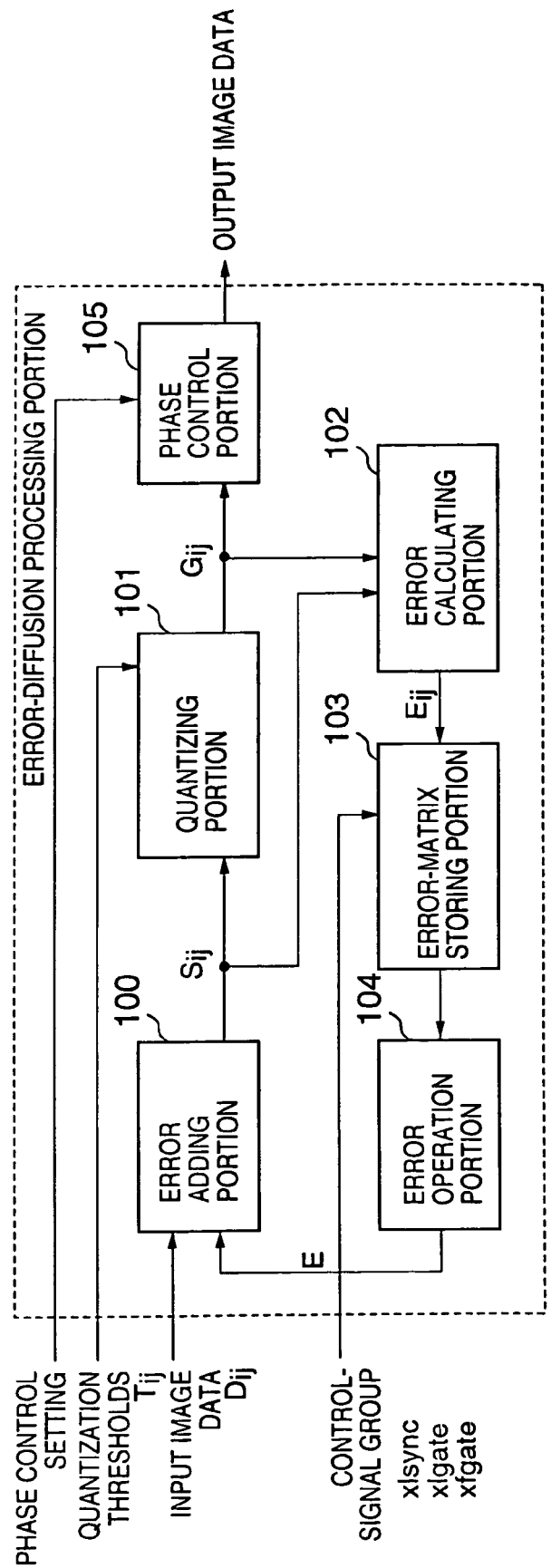
FIG. 7 is a block diagram showing an error-diffusion processing portion in the related art.
Figure 19:
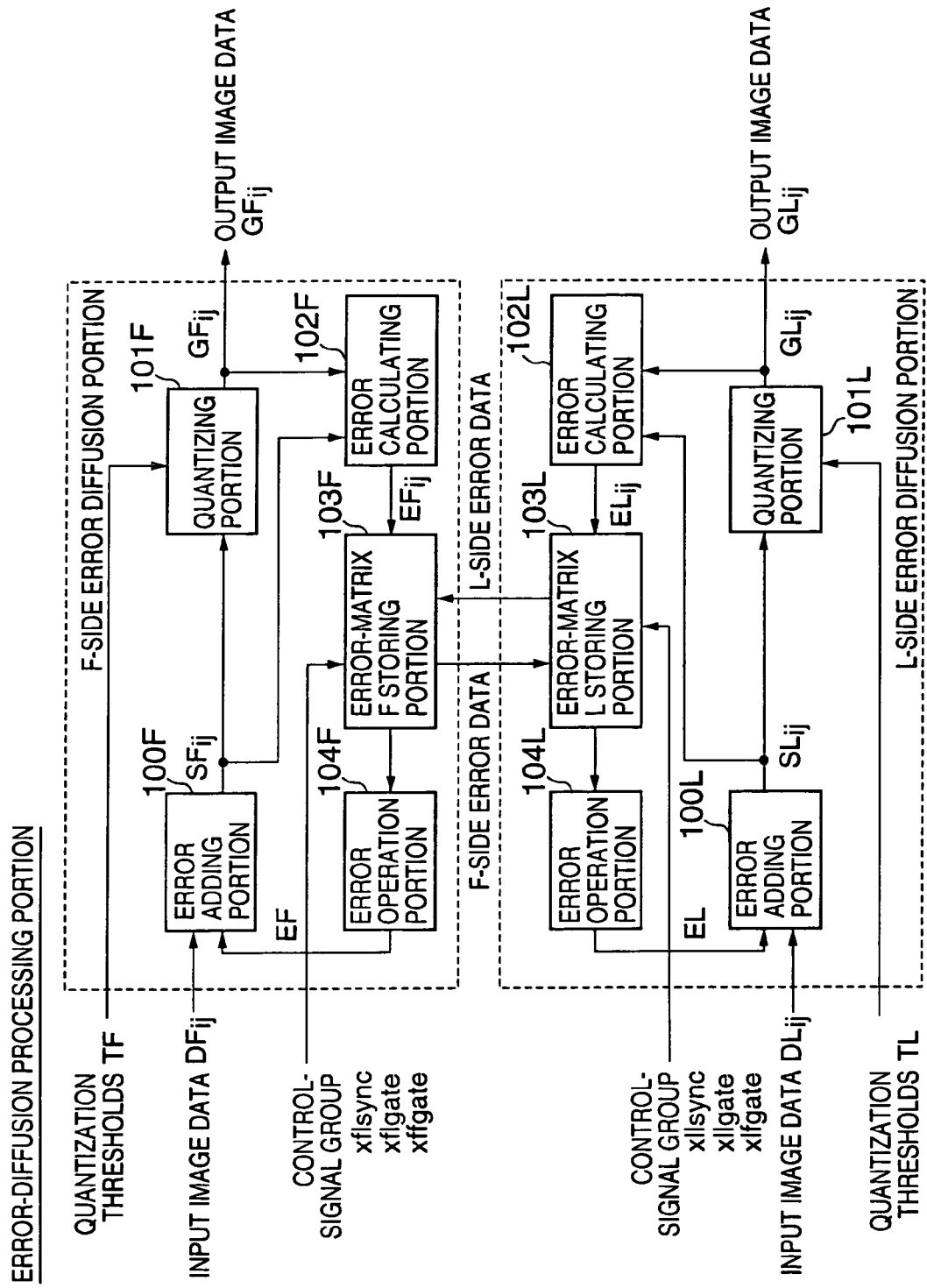
FIG. 19 is a block diagram showing an error-diffusion processing portion of an image processing method in a variant embodiment of the third embodiment of the present invention.

As shown in FIG. 19, it is possible that the matrix-data adding/subtracting portions 106F and 106L are omitted from the arrangement shown in FIG. 16. In the arrangement shown in FIG. 19, the image data $SF_{ij}$ output from the error addition portion 100F is directly input to the quantizing portion 101F, and the image data $SL_{ij}$ output from the error addition portion 100L is directly input to the quantizing portion 101L, as in the related art shown in FIG. 7.

Further, the present invention is not limited to the above-described embodiments and variations and modifications may be made without departing from the scope of the present invention.

The present application is based on Japanese priority application No. 10-345865, filed on Dec. 4, 1998, the entire contents of which are hereby incorporated by reference.

What is claimed is:

1. An image processing method, comprising:
    adding together input multi-tone image data and peripheral error information;
    adding/subtracting to or from multi-tone image data calculated in said adding, a random number in a matrix prepared for each set of pixels of the input multi-tone image data;
    quantizing multi-tone image data calculated in said adding/subtracting into image data, the number of bits of which image data being smaller than the number of bits of the multi-tone image data calculated in said adding/subtracting;
    calculating an error based on the multi-tone image data calculated in said adding and the image data quantized in said quantizing;
    storing the error calculated in said calculating for each peripheral pixel; and
    calculating the peripheral error information based on the errors stored in said storing for respective peripheral pixels, and providing the peripheral error information to said adding.

2. An image processing method, comprising:
    adding together input multi-tone image data and peripheral error information;
    adding/subtracting to or from, in accordance with 1-bit data in a matrix prepared for each set of pixels of the input multi-tone image data, multi-tone image data calculated in said adding, a predetermined adding/subtracting value;
    quantizing multi-tone image data calculated in said adding/subtracting into image data, the number of bits of which image data being smaller than the number of bits of the multi-tone image data calculated in said adding/subtracting;
    calculating an error based on the multi-tone image data calculated in said adding and the image data quantized in said quantizing;
    storing the error calculated in said error calculating for each peripheral pixel; and
    calculating the peripheral error information based on the errors stored in said storing for respective peripheral pixels, and providing the peripheral error information to said adding.

3. An image processing method comprising a plurality of error-diffusion processings for image data of a plurality of divisions of each line, respectively, each of said plurality of error-diffusion processings comprising:
    adding together input multi-tone image data of a respective one of the plurality of divisions and peripheral error information;
    adding/subtracting to or from multi-tone image data calculated in said error adding, a random number in a matrix prepared for each set of pixels of the input multi-tone image data of the respective one of the plurality of divisions;
    quantizing multi-tone image data calculated in said adding/subtracting into image data, the number of bits of which image data being smaller than the number of bits of the multi-tone image data calculated in said adding/subtracting;
    calculating an error based on the multi-tone image data calculated in said adding and the image data quantized in-said quantizing;
    storing the error calculated in said calculating for each peripheral pixel; and
    calculating the peripheral error information based on the errors stored in said storing for respective peripheral pixels, and providing the peripheral error information to said adding,
    wherein, in order, in said error operation calculating of each of said plurality of error-diffusion processings, to calculate the peripheral error information based on the errors of respective peripheral pixels at a boundary between adjacent divisions, the error of at least one peripheral pixel at the boundary is sent/received between at least two error storing

* * * * *